(12) United States Patent
Zhou

(10) Patent No.: US 10,931,745 B2
(45) Date of Patent: Feb. 23, 2021

(54) NETWORK RESOURCE BALANCING METHOD AND APPARATUS

(71) Applicant: Huawei Technologies Co., Ltd., Shenzhen (CN)

(72) Inventor: Wei Zhou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 413 days.

(21) Appl. No.: 15/391,152

(22) Filed: Dec. 27, 2016

(65) Prior Publication Data
US 2017/0111443 A1   Apr. 20, 2017

Related U.S. Application Data

(63) Continuation of application No. PCT/CN2014/081073, filed on Jun. 28, 2014.

(51) Int. Cl.
*H04L 29/08* (2006.01)
*H04L 29/12* (2006.01)
*H04L 12/00* (2006.01)

(52) U.S. Cl.
CPC ........ *H04L 67/1008* (2013.01); *H04L 61/103* (2013.01); *H04L 61/1511* (2013.01); *H04L 61/6022* (2013.01); *H04L 67/10* (2013.01)

(58) Field of Classification Search
CPC ............... H04L 67/1008; H04L 61/103; H04L 61/1511; H04L 61/6022; H04L 67/10
(Continued)

(56) References Cited

U.S. PATENT DOCUMENTS 6,266,335 B1    7/2001  Bhaskaran
2006/0059253 A1*  3/2006  Goodman ............. G06Q 10/10
                                                           709/223
(Continued)

FOREIGN PATENT DOCUMENTS

CN       101404619 A      4/2009
CN       103138990 A      6/2013
(Continued)

OTHER PUBLICATIONS

Foreign Communication From a Counterpart Application, Russian Application No. 2017102497, Russian Decision on Grant dated Mar. 21, 2018, 12 pages.
(Continued)

*Primary Examiner* — Umar Cheema
*Assistant Examiner* — Tony Williams
(74) *Attorney, Agent, or Firm* — Conley Rose, P.C.

(57) ABSTRACT

A network balancing method and apparatus, where the method includes obtaining, by a processor in a cloud computing platform, identifier information of a virtual machine and identifier information of a domain including virtual machines that are sent by a controller in the cloud computing platform, where a correspondence exists between the identifier information of the virtual machine and the identifier information of the domain including the virtual machines, and after receiving an access request packet, determining, by the processor, the virtual machines in the domain according to the identifier information of the domain in the access request packet, further selecting a virtual machine according to load information of the virtual machines in the domain, and sending the access request packet to the selected virtual machine.

13 Claims, 3 Drawing Sheets

(58) Field of Classification Search
USPC .......................................................... 709/226
See application file for complete search history.

(56) References Cited

U.S. PATENT DOCUMENTS

| | | | | |
|---|---|---|---|---|
| 2007/0192329 | A1* | 8/2007 | Croft | G06F 3/1415 |
| 2007/0198656 | A1* | 8/2007 | Mazzaferri | G06F 3/1415 |
| | | | | 709/218 |
| 2009/0291684 | A1* | 11/2009 | Sullivan | H04L 63/10 |
| | | | | 455/435.1 |
| 2011/0078303 | A1* | 3/2011 | Li | H04L 67/1012 |
| | | | | 709/224 |
| 2011/0090911 | A1* | 4/2011 | Hao | H04L 12/4633 |
| | | | | 370/395.53 |
| 2011/0119748 | A1* | 5/2011 | Edwards | G06F 9/5077 |
| | | | | 726/12 |
| 2011/0202927 | A1* | 8/2011 | Miloushev | G06F 9/5016 |
| | | | | 718/104 |
| 2012/0014387 | A1* | 1/2012 | Dunbar | H04L 12/4641 |
| | | | | 370/395.53 |
| 2012/0089980 | A1* | 4/2012 | Sharp | G06F 9/45558 |
| | | | | 718/1 |
| 2012/0246637 | A1* | 9/2012 | Kreeger | H04L 67/1038 |
| | | | | 718/1 |
| 2012/0250682 | A1* | 10/2012 | Vincent | H04L 12/4633 |
| | | | | 370/390 |
| 2013/0086236 | A1* | 4/2013 | Baucke | H04L 45/50 |
| | | | | 709/223 |
| 2013/0304903 | A1* | 11/2013 | Mick | H04L 43/0817 |
| | | | | 709/224 |
| 2013/0332573 | A1 | 12/2013 | Hegland et al. | |
| 2014/0052864 | A1* | 2/2014 | Van Der Linden | H04L 47/70 |
| | | | | 709/226 |

FOREIGN PATENT DOCUMENTS

| | | |
|---|---|---|
| EP | 1048145 A1 | 11/2000 |
| WO | 9933227 A1 | 7/1999 |
| WO | 2013085981 A1 | 6/2013 |

OTHER PUBLICATIONS

Machine Translation and Abstract of Chinese Publication No. CN101404619, Apr. 8, 2009, 18 pages.
Machine Translation and Abstract of Chinese Publication No. CN103138990, Jun. 5, 2013, 7 pages.
Foreign Communication From a Counterpart Application, European Application No. 14895858.0, Extended European Search Report dated May 26, 2017, 13 pages.
Foreign Communication From a Counterpart Application, PCT Application No. PCT/CN2014/081073, English Translation of International Search Report dated May 27, 2015, 2 pages.
Foreign Communication From a Counterpart Application, PCT Application No. PCT/CN2014/081073, English Translation of Written Opinion dated May 27, 2015, 9 pages.

* cited by examiner

A balancing module receives identifier information and load information of a virtual machine that are sent by a controller and identifier information, which is sent by the controller, of a domain that includes multiple virtual machines and to which the virtual machine belongs, where a correspondence exists between the identifier information of the virtual machine and the identifier information of the domain including the multiple virtual machines — S301

The balancing module receives an access request packet, determines identifier information of the multiple virtual machines in the domain and load information of the multiple virtual machines in the domain according to the identifier information that is of the domain including the multiple virtual machines and that is carried in the access request packet, selects a virtual machine according to the load information of the multiple virtual machines, and sends the access request packet to the selected virtual machine according to identifier information of the selected virtual machine. — S302

FIG. 3

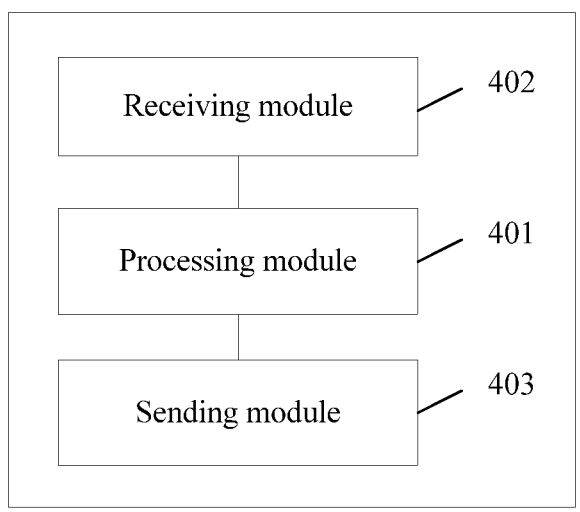

FIG. 4

NETWORK RESOURCE BALANCING METHOD AND APPARATUS

CROSS-REFERENCE TO RELATED APPLICATIONS

This application is a continuation of International Patent Application No. PCT/CN2014/081073 filed on Jun. 28, 2014, which is hereby incorporated by reference in its entirety.

TECHNICAL FIELD

Embodiments of the present disclosure relate to the communications field, and in particular, to a network resource balancing method and apparatus.

BACKGROUND

Cloud computing is a computing mode in which dynamically scalable and virtualized resources are provided in a serving manner over the Internet. The resources include a series of resources that can be dynamically upgraded and virtualized, and the resources can be shared by users of the cloud computing and can be easily accessed over the Internet.

A virtualization technology is a key technology that implements the cloud computing. A virtual machine template exists on a cloud computing platform, and the virtual machine template is instantiated to generate multiple virtual machines for users to use. To improve network resource utilization, the multiple virtual machines need to be used in a balanced manner. In current cloud computing, a network resource load balancing method is notifying a client of a resource status of each virtual machine. Further, an independent Internet Protocol (IP) address is first assigned to each virtual machine. The cloud computing platform sends content such as the IP address of each virtual machine and load information of the virtual machine to the client when a user accesses a network using the client. The client selects a virtual machine according to the load information of the virtual machine using a specific selection protocol.

In an existing cloud computing technology, a network resource load balancing method needs to be implemented using an external feature, that is, the method needs to be implemented by means of an interaction between a client and a cloud computing platform. In addition, a new protocol needs to be added. The virtual machine needs to be adaptively configured using a gateway selection protocol when a virtual machine is a gateway, and the virtual machine needs to be adaptively configured using a virtual machine selection protocol when a virtual machine is a management entity. As described above, network resource load balancing needs to be implemented by means of an interaction between a cloud computing platform and an external client and by adding a new protocol, which undoubtedly reduces network resource balancing efficiency.

SUMMARY

Embodiments of the present disclosure provide a network resource balancing method that effectively improves network resource balancing efficiency by balancing network resources in a cloud computing platform.

According to a first aspect, a network resource balancing method is provided, including receiving, by a balancing module, identifier information and load information of a virtual machine that are sent by a controller and identifier information, which is sent by the controller, of a domain that includes multiple virtual machines and to which the virtual machine belongs, where a correspondence exists between the identifier information of the virtual machine and the identifier information of the domain including the multiple virtual machines, and receiving, by the balancing module, an access request packet, determining, according to the identifier information that is of the domain including the virtual machines and that is carried in the access request packet, identifier information of the multiple virtual machines in the domain and load information of the multiple virtual machines in the domain, where the identifier information of the multiple virtual machines in the domain corresponds to the identifier information that is of the domain and that is carried in the access request packet, selecting a virtual machine according to the load information of the multiple virtual machines, and sending the access request packet to the selected virtual machine according to identifier information of the selected virtual machine.

With reference to the first aspect, in a first possible implementation manner, the identifier information of the virtual machine includes an IP address and a media access control (MAC) address, the identifier information of the domain including the multiple virtual machines includes an IP address the same as the IP address of the virtual machine and a MAC address different from the MAC address of the virtual machine, and the virtual machines in the domain including the multiple virtual machines have a same IP address and different MAC addresses.

With reference to the first possible implementation manner of the first aspect, in a second possible implementation manner, the method further includes sending, by the balancing module, the IP address of the domain including the multiple virtual machines to a domain name system (DNS) server such that a client obtains, according to a domain name, the IP address of the domain including the multiple virtual machines from the DNS server.

With reference to the second possible implementation manner of the first aspect, in a third possible implementation manner, the method further includes receiving, by the balancing module, Address Resolution Protocol (ARP) request information sent by a previous-hop device of the balancing module, where the ARP request information includes the IP address of the domain including the multiple virtual machines and is used to request the MAC address corresponding to the IP address of the domain, sending, by the balancing module, the MAC address of the domain including the multiple virtual machines to the previous-hop device of the balancing module, and receiving, by the balancing module, an access request packet includes receiving, by the balancing module, the access request packet that carries the identifier information of the domain including the multiple virtual machines and that is sent by the previous-hop device of the balancing module according to the MAC address of the domain including the multiple virtual machines.

With reference to any one of the first aspect, or the first to the third implementation manners of the first aspect, in a fourth possible implementation manner, sending the access request packet to the selected virtual machine according to identifier information of the selected virtual machine includes changing, by the balancing module, a destination MAC address of the access request packet to a MAC address of the selected virtual machine, and sending the access request packet to the selected virtual machine.

With reference to the third or the fourth possible implementation manner of the first aspect, in a fifth possible implementation manner, the IP address in the ARP request information is carried in the access request packet that is sent by the client according to the IP address of the domain including the multiple virtual machines and that is received by the previous-hop device of the balancing module.

According to a second aspect, a network resource balancing method is provided, including starting, by a controller, multiple virtual machines and separately assigning identifier information to the multiple virtual machines, assigning, by the controller according to the identifier information assigned to the multiple virtual machines, identifier information to a domain including the multiple virtual machines, receiving, by the controller, load information sent by the multiple virtual machines, and sending, by the controller to a balancing module, the identifier information of the multiple virtual machines, the load information of the multiple virtual machines, and the identifier information of the domain including the multiple virtual machines.

With reference to the second aspect, in a first possible implementation manner, separately assigning, by a controller, identifier information to the multiple virtual machines includes assigning, by the controller, a same IP address and different MAC addresses to the multiple virtual machines, and assigning, by the controller according to the identifier information assigned to the multiple virtual machines, identifier information to a domain including the multiple virtual machines includes assigning, by the controller according to the same IP address and the different MAC addresses assigned to the multiple virtual machines, an IP address the same as the IP address of the multiple virtual machines and a MAC address different from MAC addresses of the multiple virtual machines to the domain including the multiple virtual machines.

With reference to the second aspect or the first possible implementation manner of the second aspect, in a second possible implementation manner, before receiving, by the controller, load information of the virtual machines, the method further includes sending, by the controller, request information to the multiple virtual machines to request the load information of the multiple virtual machines, and receiving, by the controller, the load information sent by the multiple virtual machines, or receiving, by the controller, load information of the multiple virtual machines includes receiving, by the controller, the load information proactively sent by the multiple virtual machines.

With reference to the second aspect or the first or the second possible implementation manner of the second aspect, in a third possible implementation manner, when load of computing nodes is unbalanced, the controller selects a virtual machine in the computing nodes and instructs the virtual machine to migrate.

With reference to the third possible implementation manner of the second aspect, in a fourth possible implementation manner, that the controller selects a virtual machine in the computing nodes and instructs the virtual machine to migrate includes selecting, by the controller according to load information of virtual machines in the computing nodes, a virtual machine whose load is unbalanced, and sending a message to the virtual machine, where the message is used to instruct the virtual machine to migrate to another computing node.

According to a third aspect, a network resource balancing device is provided, including a receiving module configured to receive identifier information and load information of a virtual machine that are sent by a controller and identifier information, which is sent by the controller, of a domain that includes multiple virtual machines and to which the virtual machine belongs, where a correspondence exists between the identifier information of the virtual machine and the identifier information of the domain including the multiple virtual machines, and after an access request packet is received, a processing module configured to determine, according to the identifier information that is of the domain including the multiple virtual machines and that is carried in the access request packet, identifier information of the multiple virtual machines in the domain and load information of the multiple virtual machines in the domain, where the identifier information of the multiple virtual machines in the domain corresponds to an identifier that is of the domain and that is carried in the access request packet, select a virtual machine according to the load information of the multiple virtual machines, and send the access request packet to the selected virtual machine according to identifier information of the selected virtual machine.

With reference to the third aspect, a network resource balancing device is provided, including a receiving module configured to receive identifier information and load information of a virtual machine that are sent by a controller and identifier information, which is sent by the controller, of a domain that includes multiple virtual machines and to which the virtual machine belongs, where a correspondence exists between the identifier information of the virtual machine and the identifier information of the domain including the multiple virtual machines, and after an access request packet is received, a processing module configured to determine, according to the identifier information that is of the domain including the multiple virtual machines and that is carried in the access request packet, identifier information of the multiple virtual machines in the domain and load information of the multiple virtual machines in the domain, where the identifier information of the multiple virtual machines in the domain corresponds to an identifier that is of the domain and that is carried in the access request packet, select a virtual machine according to the load information of the multiple virtual machines, and send the access request packet to the selected virtual machine according to identifier information of the selected virtual machine.

With reference to the third aspect, a first possible implementation manner of the third aspect includes the identifier information of the virtual machine includes an IP address and a MAC address, the identifier information of the domain including the multiple virtual machines includes an IP address the same as the IP address of the virtual machine and a MAC address different from the MAC address of the virtual machine, and the virtual machines in the domain including the multiple virtual machines have a same IP address and different MAC addresses.

With reference to the first possible implementation manner of the third aspect, a second possible implementation manner includes a sending module configured to send the IP address of the domain including the multiple virtual machines to a DNS server such that a client obtains, according to a domain name, the IP address of the domain including the multiple virtual machines from the DNS server.

With reference to the second possible implementation manner of the third aspect, a third possible implementation manner includes the receiving module that is further configured to receive ARP request information sent by a previous-hop device of the apparatus, where the ARP request information includes the IP address of the domain including the multiple virtual machines and is used to request the MAC address corresponding to the IP address of the domain. The sending module is further configured to send the MAC address of the domain including the multiple virtual machines to the previous-hop device of the apparatus, and the receiving module that is configured to receive the access request packet receives the access request packet that carries the identifier information of the domain including the multiple virtual machines and that is sent by the previous-hop device of the apparatus according to the MAC address of the domain including the multiple virtual machines.

With reference to any one of the third aspect, or the first to the third possible implementation manners of the third aspect, in a fourth possible implementation manner of the third aspect, the processing module that is configured to send the access request packet to the selected virtual machine according to the identifier information of the selected virtual machine is configured to change a destination MAC address of the access request packet to a MAC address of the selected virtual machine, and send the changed access request packet to the selected virtual machine.

With reference to the third or the fourth possible implementation manner of the third aspect, in a fifth possible implementation manner, the IP address in the ARP request message is carried in the access request packet that is sent by the client according to the IP address of the domain including the multiple virtual machines and that is received by the previous-hop device of the apparatus.

According to a fourth aspect, a network resource balancing apparatus is provided, including a processing module configured to start multiple virtual machines and separately assign identifier information to the multiple virtual machines, and further configured to assign, according to the identifier information assigned to the multiple virtual machines, identifier information to a domain including the multiple virtual machines. A receiving module configured to receive load information sent by the multiple virtual machines, and a sending module configured to send, to a balancing module, the identifier information of the multiple virtual machines, the load information of the multiple virtual machines, and the identifier information of the domain including the multiple virtual machines.

With reference to the fourth aspect, in a first possible implementation manner, the processing module of the apparatus that is configured to separately assign the identifier information to the multiple virtual machines is configured to assign a same IP address and different MAC addresses to the multiple virtual machines, and the processing module that is configured to assign, according to the identifier information assigned to the multiple virtual machines, the identifier information to the domain including the multiple virtual machines is configured to assign, according to the same IP address and the different MAC addresses assigned to the multiple virtual machines, an IP address the same as the IP address of the multiple virtual machines and a MAC address different from MAC addresses of the multiple virtual machines to the domain including the multiple virtual machines.

With reference to the fourth aspect or the first possible implementation manner of the fourth aspect, in a second possible implementation manner, the sending module is further configured to send request information to the multiple virtual machines to request the load information of the multiple virtual machines, and the receiving module is configured to receive the load information sent by the multiple virtual machines, or the receiving module that is configured to receive the load information sent by the multiple virtual machines is configured to receive the load information proactively sent by the multiple virtual machines.

With reference to the fourth aspect, or the first or the second possible implementation manner of the fourth aspect, in a third possible implementation manner, when load of computing nodes is unbalanced, the processing module is further configured to select a virtual machine in the computing nodes and instruct the virtual machine to migrate.

With reference to the third possible implementation manner of the fourth aspect, in a fourth possible implementation manner, the processing module that is configured to select the virtual machine in the computing nodes and instruct the virtual machine to migrate is configured to select, according to load information of virtual machines in the computing nodes, a virtual machine whose load is unbalanced, and send a message to the virtual machine, where the message is used to instruct the virtual machine to migrate to another computing node.

Therefore, based on the technical solutions provided in the embodiments of the present disclosure, a balancing module in a cloud computing platform obtains identifier information of a virtual machine and identifier information of a domain including virtual machines that are sent by a controller in the cloud computing platform, where a correspondence exists between the identifier information of the virtual machine and the identifier information of the domain including the virtual machines, and after receiving an access request packet, the balancing module determines the virtual machines in the domain according to the identifier information of the domain in the access request packet, further selects a virtual machine according to load information of the virtual machines in the domain, and sends the access request packet to the selected virtual machine. In this way, network resources can be balanced in the cloud computing platform, instead of balancing network resources by means of an interaction between the cloud computing platform and an external client and by adding a new protocol. Therefore, network resource balancing efficiency is effectively improved.

BRIEF DESCRIPTION OF DRAWINGS

To describe the technical solutions in the embodiments of the present disclosure more clearly, the following briefly describes the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

FIG. 3 shows a schematic flowchart of a network resource balancing method according to an embodiment of the present disclosure;

FIG. 4 shows a schematic block diagram of a network resource balancing apparatus according to an embodiment of the present disclosure;

DESCRIPTION OF EMBODIMENTS

The following clearly and completely describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

It should be understood that, the technical solutions in the embodiments of the present disclosure may be applied to various communications systems, such as a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, LTE time division duplex (TDD), a Universal Mobile Telecommunications System (UMTS), a Worldwide Interoperability for Microwave Access (WiMAX) communications system.

Figure 1:
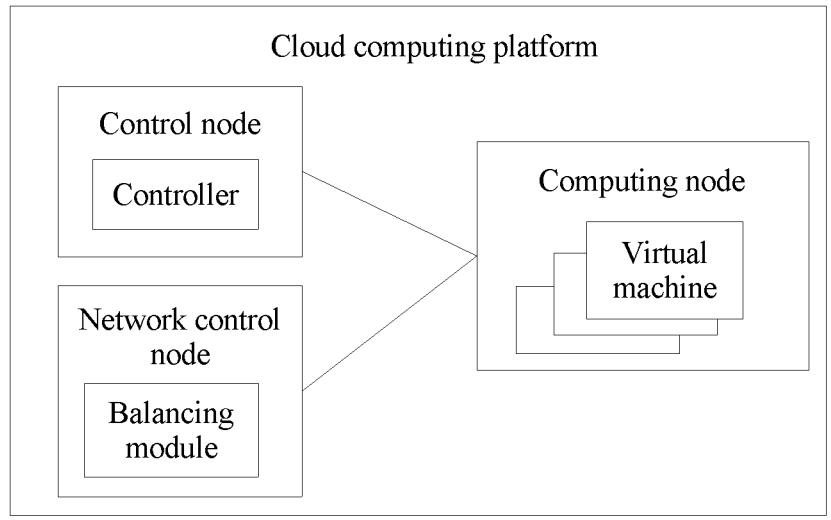
FIG. 1 shows a schematic diagram of a cloud computing platform on which the embodiments of the present disclosure are based.

FIG. 1 shows a schematic diagram of a cloud computing platform on which the embodiments of the present disclosure are based. It should be understood that the network architecture shown in FIG. 1 is a preferred application architecture of the embodiments of the present disclosure, but the embodiments of the present disclosure may also be based on another network architecture, which is not limited in the embodiments of the present disclosure.

As shown in FIG. 1, a cloud computing platform includes a control node, a computing node, and a network control node.

Cloud computing is a computing mode in which dynamically scalable and virtualized resources are provided in a serving manner over the Internet. The resources include a series of resources that can be dynamically upgraded and virtualized, and the resources can be shared by users of the cloud computing and can be easily accessed over the Internet. A pay-per-use model is generally used in the cloud computing. In the model, available, convenient, and on-demand network access is provided to access a shared pool of configurable computing resources (the resources include a network, a server, storage, application software, and a service). The resources can be rapidly provisioned, and only a minimal management effort is required, or few interactions are performed with a service provider.

A platform for implementing a cloud computing function is referred to as a cloud computing platform. The cloud computing platform is also referred to a cloud platform. The cloud computing platform may be classified into three types, a storage cloud platform focusing on data storage, a computing cloud platform focusing on data processing, and a comprehensive cloud computing platform on which both computing and data storage processing are involved. The cloud computing platform may run on a server, which is not limited in the present disclosure.

A cloud computing platform includes a control node, a computing node, and a network control node. The control node is used to control a running life cycle of a virtual machine on the entire cloud computing platform, to implement management on a computing resource. As shown in FIG. 1, a controller may be located in the control node, and is mainly used to manage the virtual machine, for example, to start and generate the virtual machine, receive and recycle information about a deleted virtual machine, and implement another management function. As shown in FIG. 1, the computing node is used to run the virtual machine. The control node and the computing node are logical division, and both may be located on a same physical machine. The network control node is used to provide a network service for the cloud computing platform. As shown in FIG. 1, a balancing module is located in the network control node, and is mainly used to implement a load balancing function between virtual machines. Likewise, the network control node, the control node, and the computing node are also logical division, and may be deployed on a same physical machine.

Figure 2:
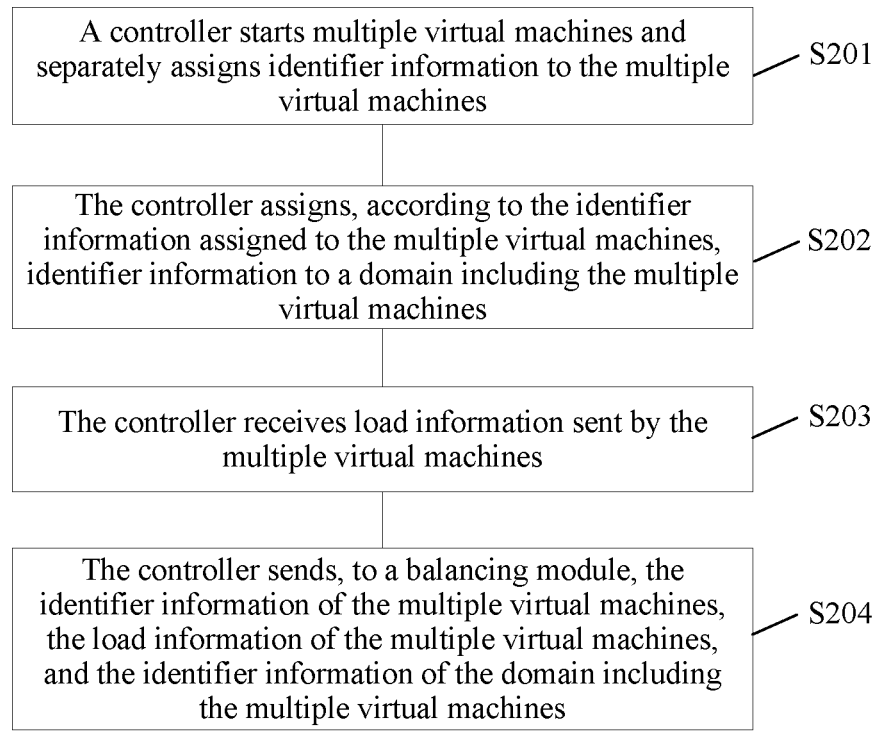
FIG. 2 shows a schematic flowchart of a network resource balancing method according to an embodiment of the present disclosure.

FIG. 2 shows a schematic flowchart of a network resource balancing method according to an embodiment of the present disclosure. The method may be executed by any appropriate apparatus, for example, may be executed by a controller, which, however, is not limited in the present disclosure. As shown in FIG. 2, the method includes the following steps.

Step S201: The controller starts multiple virtual machines and separately assigns identifier information to the multiple virtual machines.

The controller may create a virtual machine on a cloud computing platform. That is, the controller starts the multiple virtual machines on the cloud computing platform. The controller assigns the identifier information to the multiple virtual machines. Generally, the identifier information may be an IP address and a MAC address of the virtual machine. The controller may separately assign a same IP address and different MAC addresses to the multiple virtual machines.

Step S202: The controller assigns, according to the identifier information assigned to the multiple virtual machines, identifier information to a domain including the multiple virtual machines.

Further, after the controller separately assigns the identifier information to the multiple virtual machines (that is, the controller separately assigns the same IP address and the different MAC addresses to the multiple virtual machines in step S201), the controller assigns, based on the identifier information assigned to the multiple virtual machines, the identifier information to the domain including the multiple virtual machines. Further, the controller assigns, to the domain including the multiple virtual machines, an IP address the same as the IP address of the multiple virtual machines and a MAC address different from MAC addresses of the multiple virtual machines.

Therefore, a correspondence is formed between the domain including the multiple virtual machines and the multiple virtual machines because of the same IP address.

Step S203: The controller receives load information sent by the multiple virtual machines.

Further, the controller may send a request message to the multiple virtual machines to request the load information of the multiple virtual machines, and the multiple virtual machines send respective load information to the controller. Alternatively, the multiple virtual machines proactively send respective load information to the controller.

In addition, this embodiment of the present disclosure does not impose a limitation on an order of steps S203 and S202.

Step S204: The controller sends, to a balancing module, the identifier information of the multiple virtual machines, the load information of the multiple virtual machines, and the identifier information of the domain including the multiple virtual machines.

Further, the controller sends the identifier information of the multiple virtual machines (the IP address and the MAC addresses of the multiple virtual machines), the load information of the multiple virtual machines, and the identifier information of the domain including the multiple virtual machines (the IP address and the MAC address of the domain including the multiple virtual machines).

In conclusion, according to the network resource balancing method provided in this embodiment of the present disclosure, a controller starts multiple virtual machines, assigns identifier information to the multiple virtual machines, and assigns, based on the identifier information assigned to the multiple virtual machines, identifier information to a domain including the multiple virtual machines such that a correspondence is formed between the multiple virtual machines and the domain including the multiple virtual machines. The controller receives load information sent by the multiple virtual machines. The controller further sends, to a balancing module, the identifier information of the multiple virtual machines, the identifier information of the domain including the multiple virtual machines, and the load information of the multiple virtual machines such that the balancing module can send the identifier information of the domain including the multiple virtual machines to a client, and select an appropriate virtual machine for the client according to the identifier information of the domain including the multiple virtual machines, the load information of the multiple virtual machines, and the identifier information of the multiple virtual machines after receiving an access request packet of the client. In this way, based on an interaction between a controller and a query machine in a cloud computing platform, network resource balancing can be implemented in the cloud computing platform, instead of balancing network resources by means of an interaction between the cloud computing platform and an external client and by adding a new protocol. Therefore, network resource balancing efficiency is effectively improved.

Optionally, the technical solution provided in this embodiment of the present disclosure, the controller may adjust locations of virtual machines in different computing nodes to implement load balancing between the computing nodes when load of computing nodes is unbalanced. That is, this embodiment of the present disclosure, the controller selects a virtual machine in the computing nodes and instructs the virtual machine to migrate.

Further, the controller selects, according to load information of virtual machines in computing nodes, a virtual machine whose load is unbalanced, and sends a message to the selected virtual machine, where the message is used to instruct the virtual machine to migrate.

The virtual machine undergoes virtual machine migration between different computing nodes according to the message sent by the controller.

An IP address and a MAC address of the virtual machine do not change when the virtual machine is migrated to a different computing node. Therefore, the balancing module can still select an appropriate virtual machine according to an original IP address and an original MAC address of the virtual machine, and sends an access request packet.

Therefore, based on the foregoing technical solution, when load of computing nodes is unbalanced, a controller instructs, according to load information of virtual machines in the computing nodes, a virtual machine to migrate. An IP address and identifier information of the virtual machine do not change when the virtual machine is being migrated. Therefore, an effect of computing node load balancing is achieved using a cloud computing platform, without affecting client access.

FIG. 3 shows a schematic flowchart of a network resource balancing method according to an embodiment of the present disclosure. The method may be executed by a balancing module, which, however, is not limited in the present disclosure. The method provided in this embodiment of the present disclosure and the method provided in the embodiment of the present disclosure shown in FIG. 2 may be used together.

Step S301: The balancing module receives identifier information and load information of a virtual machine that are sent by a controller and identifier information, which is sent by the controller, of a domain that includes multiple virtual machines and to which the virtual machine belongs, where a correspondence exists between the identifier information of the virtual machine and the identifier information of the domain including the multiple virtual machines.

The identifier information of the virtual machine includes an IP address and a MAC address. The identifier information of the domain including the multiple virtual machines includes an IP address the same as the IP address of the virtual machine and a MAC address different from the MAC address of the virtual machine. The virtual machines in the domain including the multiple virtual machines have a same IP address and different MAC addresses.

Further, the balancing module maintains the identifier information of the domain including the multiple virtual machines, and provides the IP address in the identifier information of the domain for a DNS.

The IP address in the identifier information of the domain may be maintained using the DNS server such that a client can obtain the IP address according to a domain name, and therefore, can send an access request packet to the IP address. For example, the client may find an IP address of GOOGLE from the DNS server according to a domain name of GOOGLE.

The client obtains the IP address of the domain including the multiple virtual machines from the DNS server, and the IP address is used to send the access request packet to the balancing module. Further, the client obtains, by means of query according to the domain name, the IP address of the domain including the multiple virtual machines from the DNS server. The client sends the access request packet to a previous-hop device of the balancing module according to the IP address using an intermediate device (an intermediate device between the client and the balancing module). Further, the client sends the access request packet to a next-hop device of the client according to the IP address. The next-hop device directly or indirectly (that is, the next-hop device sends the access request packet to a next-hop device of the next-hop device according to the IP address) sends the access request packet to the previous-hop device of the balancing module according to the IP address. The access request packet carries the IP address of the domain including the multiple virtual machines. The previous-hop device may be, for example, a device connected to the balancing module, such as a switch or a router.

Step S302: The balancing module receives an access request packet, determines identifier information of the multiple virtual machines in the domain and load information of the multiple virtual machines in the domain according to the identifier information that is of the domain including the multiple virtual machines and that is carried in the access request packet, selects a virtual machine according to the load information of the multiple virtual machines, and sends the access request packet to the selected virtual machine according to identifier information of the selected virtual machine.

The balancing module receiving the access request packet further includes that the previous-hop device of the balancing module receives the access request packet that carries the IP address of the domain including the multiple virtual machines, when the previous-hop device sends an ARP request about the IP address to the balancing module, the balancing module may return the corresponding MAC address such that the balancing module can receive the access request packet to be sent to the IP address. Further, the balancing module receives ARP request information sent by the previous-hop device of the balancing module. The ARP request information includes the IP address of the domain including the multiple virtual machines and is used to request the MAC address corresponding to the IP address of the domain. The balancing module sends the MAC address of the domain including the multiple virtual machines to the previous-hop device of the balancing module, and further, the previous-hop device of the balancing module sends the access request packet to the balancing module according to the MAC address of the domain including the multiple virtual machines. The access request packet carries the identifier information of the domain including the multiple virtual machines.

After receiving the access request packet, the balancing module selects the virtual machine according to the identifier information of the domain including the multiple virtual machines, the load information of the multiple virtual machines, and the identifier information of the multiple virtual machines, and sends the access request packet to the appropriate virtual machine according to the identifier information of the virtual machine. After receiving the access request packet that carries the identifier information of the domain including the multiple virtual machines, the balancing module determines the identifier information of the multiple virtual machines and the load information of the multiple virtual machines according to the identifier information of the domain including the multiple virtual machines, and selects the virtual machine. A correspondence is formed between the identifier information of the domain including the multiple virtual machines and the identifier information of the multiple virtual machines based on the same IP address. Therefore, the balancing module determines the identifier information of the multiple virtual machines in the domain according to the identifier information of the domain including the multiple virtual machines, and selects a virtual machine identifier according to the load information of the multiple virtual machines and the identifier information of the multiple virtual machines, to meet a load balancing requirement. Further, MAC address information in the identifier information of the selected virtual machine may be used to replace the MAC address carried in the access request packet such that the access request packet can be sent to the corresponding virtual machine. A cloud computing platform changes a source MAC address of the access request packet to a MAC address of the balancing module when sending the access request packet subsequently.

Therefore, based on the network resource balancing method provided in this embodiment of the present disclosure, a balancing module receives identifier information and load information of a virtual machine that are sent by a controller and identifier information, which is sent by the controller, of a domain that includes multiple virtual machines and to which the virtual machine belongs, where a correspondence exists between the identifier information of the virtual machine and the identifier information of the domain including the multiple virtual machines, after receiving an access request packet, the balancing module determines identifier information of the multiple virtual machines in the domain and load information of the multiple virtual machines in the domain according to the identifier information that is of the domain including the multiple virtual machines and that is carried in the access request packet, selects a virtual machine according to the load information of the multiple virtual machines, and sends the access request packet to the selected virtual machine according to identifier information of the selected virtual machine. Based on the technical solution provided in the foregoing embodiment, network resource load balancing only needs to be implemented in a cloud computing platform based on an interaction between a controller and a query machine in the cloud computing platform, without obtaining, by a client by means of an interaction with the cloud computing platform, load information of a virtual machine to select an appropriate virtual machine. Therefore, network resource balancing efficiency is improved.

FIG. 4 shows a schematic block diagram of a network resource balancing apparatus according to an embodiment of the present disclosure. The network resource balancing apparatus may be a controller, which, however, is not limited in the present disclosure. The apparatus provided in this embodiment of the present disclosure shown in FIG. 4 may execute the network resource balancing method shown in FIG. 2.

As shown in FIG. 4, the apparatus includes a processing module 401, a receiving module 402, and a sending module 403.

The processing module 401 is configured to start multiple virtual machines and separately assign identifier information to the multiple virtual machines, and is further configured to assign, according to the identifier information assigned to the multiple virtual machines, identifier information to a domain including the multiple virtual machines.

When separately assigning the identifier information to the multiple virtual machines, the processing module 401 is configured to assign a same IP address and different MAC addresses to the multiple virtual machines, that is, the processing module 401 assigns the same IP address and the different MAC addresses to all virtual machines in the multiple virtual machines. When assigning, according to the identifier information assigned to the multiple virtual machines, the identifier information to the domain including the multiple virtual machines, the processing module 401 is configured to assign, according to the same IP address and the different MAC addresses assigned to the multiple virtual machines, an IP address the same as the IP address of the multiple virtual machines and a MAC address different from MAC addresses of the multiple virtual machines to the domain including the multiple virtual machines.

The receiving module 402 is configured to receive load information sent by the multiple virtual machines.

The sending module 403 is configured to send, to a balancing module, the identifier information of the multiple virtual machines, the load information of the multiple virtual machines, and the identifier information of the domain including the multiple virtual machines.

The sending module 403 is further configured to send request information to the multiple virtual machines to request the load information of the multiple virtual machines, and the receiving module 402 is configured to receive the load information sent by the multiple virtual machines. Alternatively, when receiving the load information sent by the multiple virtual machines, the receiving module 402 is configured to receive the load information of all the virtual machines that is proactively sent by the multiple virtual machines.

When load of computing nodes is unbalanced, the processing module 401 is further configured to select a virtual machine in the computing nodes and instruct the virtual machine to migrate, which is further configured to select, according to load information of virtual machines in the computing nodes, a virtual machine whose load is unbalanced, and send a message to the virtual machine, where the message is used to instruct the virtual machine to migrate to another computing node.

The apparatus provided in this embodiment of the present disclosure may correspond to the controller in the method shown in FIG. 2. In addition, the foregoing and other operations and/or functions of all the modules in the apparatus provided in the present disclosure are separately used to implement corresponding processes of the methods shown in FIG. 1 and FIG. 2, and for brevity, details are not described herein.

Therefore, based on the network resource balancing apparatus provided in this embodiment of the present disclosure, the apparatus starts multiple virtual machines, assigns identifier information to the multiple virtual machines, and assigns, based on the identifier information assigned to the multiple virtual machines, identifier information to a domain including the multiple virtual machines such that a correspondence is formed between the multiple virtual machines and the domain including the multiple virtual machines, a controller receives load information sent by the multiple virtual machines, and further sends, to a balancing module, the identifier information of the multiple virtual machines, the identifier information of the domain including the multiple virtual machines, and the load information of the multiple virtual machines such that the balancing module can send the identifier information of the domain including the multiple virtual machines to a client, and select an appropriate virtual machine for the client according to the identifier information of the domain including the multiple virtual machines, the load information of the multiple virtual machines, and the identifier information of the multiple virtual machines after receiving an access request packet of the client.

Figure 5:
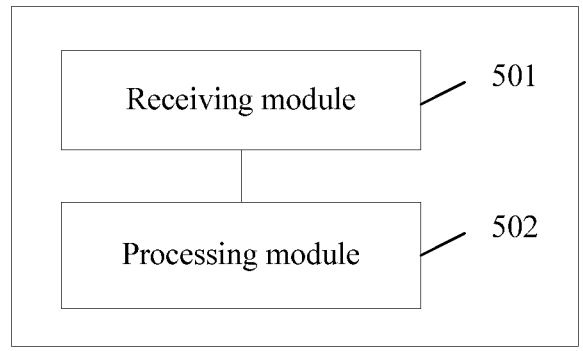
FIG. 5 shows a schematic block diagram of a network resource balancing apparatus according to an embodiment of the present disclosure.

FIG. 5 shows a schematic block diagram of a network resource balancing apparatus according to an embodiment of the present disclosure. The network resource balancing apparatus may be a balancing module, which, however, is not limited in the present disclosure. The apparatus provided in this embodiment of the present disclosure shown in FIG. 5 may execute the network resource balancing method shown in FIG. 3.

As shown in FIG. 5, the apparatus includes a receiving module 501 and a processing module 502.

The receiving module 501 is configured to receive identifier information and load information of a virtual machine that are sent by a controller and identifier information, which is sent by the controller, of a domain that includes multiple virtual machines and to which the virtual machine belongs, where a correspondence exists between the identifier information of the virtual machine and the identifier information of the domain including the multiple virtual machines.

The identifier information of the virtual machine that is sent by the controller includes an IP address and a MAC address. The identifier information of the domain including the multiple virtual machines includes an IP address the same as the IP address of the virtual machine and a MAC address different from the MAC address of the virtual machine. The virtual machines in the domain including the multiple virtual machines have a same IP address and different MAC addresses.

After an access request packet is received, the processing module 502 is configured to determine, according to the identifier information that is of the domain including the multiple virtual machines and that is carried in the access request packet, identifier information of the multiple virtual machines in the domain and load information of the multiple virtual machines in the domain, where the identifier information of the multiple virtual machines in the domain corresponds to an identifier that is of the domain and that is carried in the access request packet, select a virtual machine according to the load information of the multiple virtual machines, and send the access request packet to the selected virtual machine according to identifier information of the selected virtual machine.

The apparatus further includes a sending module (not shown) configured to send the IP address of the domain including the multiple virtual machines to a DNS server such that a client obtains, according to a domain name, the IP address of the domain including the multiple virtual machines from the DNS server.

The receiving module 501 is further configured to receive ARP request information sent by a previous-hop device of the apparatus, where the ARP request information includes the IP address of the domain including the multiple virtual machines and is used to request the MAC address corresponding to the IP address of the domain. The sending module is further configured to send the MAC address of the domain including the multiple virtual machines to the previous-hop device of the apparatus. When receiving the access request packet, the receiving module 501 is configured to receive the access request packet that carries the identifier information of the domain including the multiple virtual machines and that is sent by the previous-hop device of the apparatus according to the MAC address of the domain including the multiple virtual machines.

Further, sending the access request packet to the selected virtual machine according to the identifier information of the selected virtual machine, the processing module 502 is configured to change a destination MAC address of the access request packet to a MAC address of the selected virtual machine, and send the changed access request packet to the selected virtual machine.

Optionally, the IP address in the ARP request message is carried in the access request packet that is sent by the client according to the IP address of the domain including the multiple virtual machines and that is received by the previous-hop device of the apparatus.

The apparatus provided in this embodiment of the present disclosure may correspond to the balancing module in the method shown in FIG. 3. In addition, the foregoing and other operations and/or functions of all the modules in the apparatus provided in the present disclosure are separately used to implement corresponding processes of the methods shown in FIG. 1 and FIG. 3, and for brevity, details are not described herein.

Therefore, based on the network resource balancing apparatus provided in this embodiment of the present disclosure, the apparatus receives identifier information of multiple virtual machines, load information of the multiple virtual machines, and identifier information of a domain including the multiple virtual machines that are sent by a controller, and sends the identifier information of the domain including the multiple virtual machines to a client such that an access request message carries the identifier information of the domain when the client sends the access request message, and the apparatus determines the identifier information of the multiple virtual machines in the domain according to the identifier information of the domain, selects an appropriate virtual machine according to the identifier information of the multiple virtual machines in the domain and the load information of the multiple virtual machines, and sends the access request packet to the appropriate virtual machine. Based on the technical solution provided in the foregoing embodiment, network resource load balancing only needs to be implemented in a cloud computing platform based on an interaction between a controller and a query machine in the cloud computing platform, without obtaining, by a client by means of an interaction with the cloud computing platform, load information of a virtual machine to select an appropriate virtual machine. Therefore, network resource balancing efficiency is improved.

Figure 6:
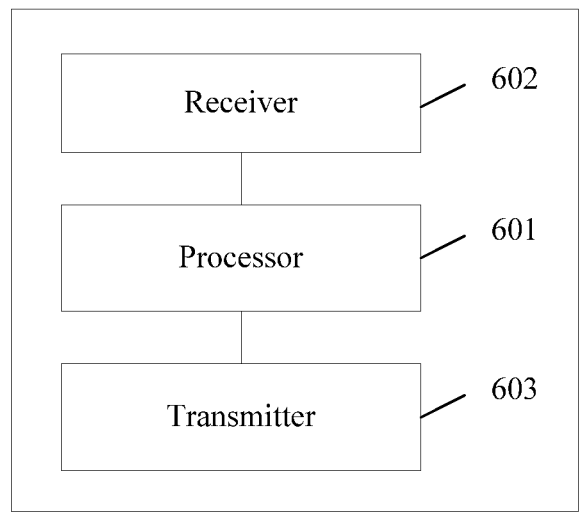
FIG. 6 shows a schematic block diagram of a network resource balancing apparatus according to an embodiment of the present disclosure.

FIG. 6 shows a schematic block diagram of a network resource balancing apparatus according to an embodiment of the present disclosure. The network resource balancing apparatus may be a controller, which, however, is not limited in the present disclosure. The apparatus provided in this embodiment of the present disclosure shown in FIG. 6 may execute the network resource balancing method shown in FIG. 2.

As shown in FIG. 6, the apparatus includes a processor 601, a receiver 602, and a transmitter 603.

The processor 601 is configured to start multiple virtual machines and separately assign identifier information to the multiple virtual machines, and is further configured to assign, according to the identifier information assigned to the multiple virtual machines, identifier information to a domain including the multiple virtual machines.

When separately assigning the identifier information to the multiple virtual machines, the processor 601 is configured to assign a same IP address and different MAC addresses to the multiple virtual machines, that is, the processor 601 assigns the same IP address and the different MAC addresses to all virtual machines in the multiple virtual machines. When assigning, according to the identifier information assigned to the multiple virtual machines, the identifier information to the domain including the multiple virtual machines, the processor 601 is configured to assign, according to the same IP address and the different MAC addresses assigned to the multiple virtual machines, an IP address the same as the IP address of the multiple virtual machines and a MAC address different from MAC addresses of the multiple virtual machines to the domain including the multiple virtual machines.

The receiver 602 is configured to receive load information sent by the multiple virtual machines.

The transmitter 603 is configured to send, to a balancing module, the identifier information of the multiple virtual machines, the load information of the multiple virtual machines, and the identifier information of the domain including the multiple virtual machines.

The transmitter 603 is further configured to send request information to the multiple virtual machines to request the load information of the multiple virtual machines, and the receiver 602 is configured to receive the load information sent by the multiple virtual machines. Alternatively, when receiving the load information sent by the multiple virtual machines, the receiver 602 is configured to receive the load information of all the virtual machines that is proactively sent by the multiple virtual machines.

The processor 601 is further configured to select a virtual machine in the computing nodes and instruct the virtual machine to migrate when load of computing nodes is unbalanced, which is further configured to select, according to load information of virtual machines in the computing nodes, a virtual machine whose load is unbalanced, and send a message to the virtual machine, where the message is used to instruct the virtual machine to migrate to another computing node.

The apparatus provided in this embodiment of the present disclosure may correspond to the controller in the method shown in FIG. 2. In addition, the foregoing and other operations and/or functions of all the modules in the apparatus provided in the present disclosure are separately used to implement corresponding processes of the methods shown in FIG. 1 and FIG. 2, and for brevity, details are not described herein.

Therefore, based on the network resource balancing apparatus provided in this embodiment of the present disclosure, the apparatus starts multiple virtual machines, assigns identifier information to the multiple virtual machines, and assigns, based on the identifier information assigned to the multiple virtual machines, identifier information to a domain including the multiple virtual machines such that a correspondence is formed between the multiple virtual machines and the domain including the multiple virtual machines, a controller receives load information sent by the multiple virtual machines, and further sends, to a balancing module, the identifier information of the multiple virtual machines, the identifier information of the domain including the multiple virtual machines, and the load information of the multiple virtual machines such that the balancing module can send the identifier information of the domain including the multiple virtual machines to a client, and select an appropriate virtual machine for the client according to the identifier information of the domain including the multiple virtual machines, the load information of the multiple virtual machines, and the identifier information of the multiple virtual machines after receiving an access request packet of the client.

It should be understood that, in this embodiment of the present disclosure, the processor 601 may be a central processing unit (CPU), or the processor 601 may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a micro-processor, or the processor may be any conventional processor or the like.

In an implementation process, the foregoing steps may be completed using a hardware integrated logical circuit in the processor, or using instructions in a form of software. The steps of the method disclosed with reference to the embodiments of the present disclosure may be directly performed by a hardware processor, or may be performed using a combination of hardware in the processor and a software module. The software module may be located in a mature storage medium in the art, such as a random access memory (RAM), a flash memory, a read-only memory (ROM), a programmable ROM, an electrically erasable programmable memory, a register, or the like. The storage medium is located in the memory, and a processor 601 reads information from the memory and completes the steps in the foregoing methods in combination with hardware in the processor 601. To avoid repetition, details are not described herein.

Figure 7:
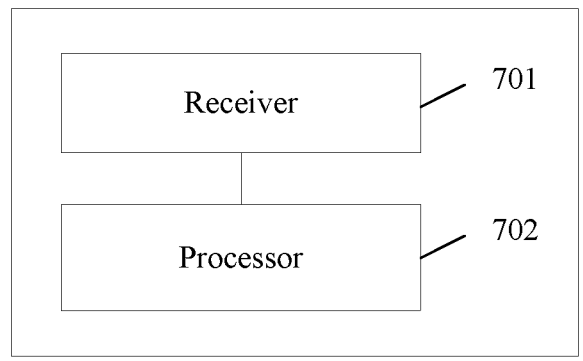
FIG. 7 shows a schematic block diagram of a network resource balancing apparatus according to an embodiment of the present disclosure.

FIG. 7 shows a schematic block diagram of a network resource balancing apparatus according to an embodiment of the present disclosure. The network resource balancing apparatus may be a balancing module, which, however, is not limited in the present disclosure. The apparatus provided in this embodiment of the present disclosure shown in FIG. 7 may execute the network resource balancing method shown in FIG. 3.

As shown in FIG. 7, the apparatus includes a receiver 701 and a processor 702.

The receiver 701 is configured to receive identifier information and load information of a virtual machine that are sent by a controller and identifier information, which is sent by the controller, of a domain that includes multiple virtual machines and to which the virtual machine belongs, where a correspondence exists between the identifier information of the virtual machine and the identifier information of the domain including the multiple virtual machines.

The identifier information of the virtual machine that is sent by the controller includes an IP address and a MAC address. The identifier information of the domain including the multiple virtual machines includes an IP address the same as the IP address of the virtual machine and a MAC address different from the MAC address of the virtual machine. The virtual machines in the domain including the multiple virtual machines have a same IP address and different MAC addresses.

After an access request packet is received, the processor 702 is configured to determine, according to the identifier information that is of the domain including the multiple virtual machines and that is carried in the access request packet, identifier information of the multiple virtual machines in the domain and load information of the multiple virtual machines in the domain, where the identifier information of the multiple virtual machines in the domain corresponds to an identifier that is of the domain and that is carried in the access request packet, select a virtual machine according to the load information of the multiple virtual machines, and send the access request packet to the selected virtual machine according to identifier information of the selected virtual machine.

The apparatus further includes a transmitter (not shown) configured to send the IP address of the domain including the multiple virtual machines to a DNS server such that a client obtains, according to a domain name, the IP address of the domain including the multiple virtual machines from the DNS server.

The receiver 701 is further configured to receive ARP request information sent by a previous-hop device of the apparatus, where the ARP request information includes the IP address of the domain including the multiple virtual machines and is used to request the MAC address corresponding to the IP address of the domain. The transmitter is further configured to send the MAC address of the domain including the multiple virtual machines to the previous-hop device of the apparatus. When receiving the access request packet, the receiver 701 is further configured to receive the access request packet that carries the identifier information of the domain including the multiple virtual machines and that is sent by the previous-hop device of the apparatus according to the MAC address of the domain including the multiple virtual machines.

Further, when sending the access request packet to the selected virtual machine according to the identifier information of the selected virtual machine, the processor 702 is configured to change a destination MAC address of the access request packet to a MAC address of the selected virtual machine, and send the changed access request packet to the selected virtual machine.

Optionally, the IP address in the ARP request message is carried in the access request packet that is sent by the client according to the IP address of the domain including the multiple virtual machines and that is received by the previous-hop device of the apparatus.

The apparatus provided in this embodiment of the present disclosure may correspond to the balancing module in the method shown in FIG. 3. In addition, the foregoing and other operations and/or functions of all the modules in the apparatus provided in the present disclosure are separately used to implement corresponding processes of the methods shown in FIG. 1 and FIG. 3, and for brevity, details are not described herein.

Therefore, based on the network resource balancing apparatus provided in this embodiment of the present disclosure, the apparatus receives identifier information of multiple virtual machines, load information of the multiple virtual machines, and identifier information of a domain including the multiple virtual machines that are sent by a controller, and sends the identifier information of the domain including the multiple virtual machines to a client such that an access request message carries the identifier information of the domain when the client sends the access request message, and the apparatus determines the identifier information of the multiple virtual machines in the domain according to the identifier information of the domain, selects an appropriate virtual machine according to the identifier information of the multiple virtual machines in the domain and the load information of the multiple virtual machines, and sends the access request packet to the appropriate virtual machine. Based on the technical solution provided in the foregoing embodiment, network resource load balancing only needs to be implemented in a cloud computing platform based on an interaction between a controller and a query machine in the cloud computing platform, without obtaining, by a client by means of an interaction with the cloud computing platform, load information of a virtual machine to select an appropriate virtual machine. Therefore, network resource balancing efficiency is improved.

It should be understood that, in this embodiment of the present disclosure, the processor 702 may be a CPU, or the processor 702 may be another general-purpose processor, a DSP, an ASIC, an FPGA, or another programmable logic device, discrete gate or transistor logic device, discrete hardware component, or the like. The general-purpose processor may be a micro-processor, or the processor 702 may be any conventional processor or the like.

In an implementation process, the foregoing steps may be completed using a hardware integrated logical circuit in the processor 702, or using instructions in a form of software. The steps of the method disclosed with reference to the embodiments of the present disclosure may be directly performed by a hardware processor, or may be performed using a combination of hardware in the processor and a software module. The software module may be located in a mature storage medium in the art, such as a RAM, a flash memory, a ROM, a programmable ROM, an electrically erasable programmable memory, a register, or the like. The storage medium is located in the memory, and a processor reads information from the memory and completes the steps in the foregoing methods in combination with hardware in the processor 702. To avoid repetition, details are not described herein.

What is claimed is:

1. A network resource balancing method, comprising:
receiving, by a receiver of a load balancing device in a cloud computing platform, identifier information of at least one virtual machine and load information of the at least one virtual machine from a controller in the cloud computing platform;
receiving, by the receiver, identifier information of a domain from the controller, wherein the domain comprises multiple virtual machines, wherein the at least one virtual machine belongs to the domain, and wherein the identifier information of the at least one virtual machine corresponds to the identifier information of the domain;
receiving, by the receiver, an access request packet of a client, wherein the access request packet comprises the identifier information of the domain;
determining, by a processor of the load balancing device according to the identifier information of the domain that is carried in the access request packet, the identifier information of each of the multiple virtual machines in the domain and load information of each of the multiple virtual machines in the domain, wherein the identifier information of each of the multiple virtual machines in the domain corresponds to the identifier information of the domain that is carried in the access request packet;
selecting, by the processor on behalf of the client, a virtual machine to meet a load balancing requirement without interaction between the cloud computing platform and an external entity, wherein the virtual machine is selected from the multiple virtual machines according to the load information of each of the multiple virtual machines; and
sending, by a transmitter of the load balancing device, the access request packet to the selected virtual machine according to identifier information of the selected virtual machine, wherein sending the access request packet to the selected virtual machine according to the identifier information of the selected virtual machine comprises:
changing, by the processor, a destination media access control (MAC) address of the access request packet to a MAC address of the selected virtual machine; and
sending the access request packet to the selected virtual machine.

2. The network resource balancing method of claim 1, wherein the identifier information of the at least one virtual machine comprises an Internet Protocol (IP) address and a media access control (MAC) address, wherein the identifier information of the domain comprising the multiple virtual machines comprises an IP address that is the same as the IP address of the at least one virtual machine and a MAC address that is different from the MAC address of the at least one virtual machine, and wherein the multiple virtual machines in the domain comprise a same IP address and different MAC addresses.

3. The network resource balancing method of claim 2, further comprising sending, by the processor, the IP address of the domain comprising the multiple virtual machines to a domain name system (DNS) server such that the client obtains, according to a domain name, the IP address of the domain comprising the multiple virtual machines from the DNS server.

4. The network resource balancing method of claim 3, further comprising:
receiving, by the processor, Address Resolution Protocol (ARP) request information from a previous-hop device of the processor, wherein the ARP request information comprises the IP address of the domain comprising the multiple virtual machines and is used to request the MAC address corresponding to the IP address of the domain; and
sending, by the processor, the MAC address of the domain comprising the multiple virtual machines to the previous-hop device of the processor, wherein receiving the access request packet comprises receiving, by the processor, the access request packet that carries the identifier information of the domain comprising the multiple virtual machines and that is from the previous-hop device of the processor according to the MAC address of the domain comprising the multiple virtual machines.

5. The network resource balancing method of claim 4, wherein the IP address in the ARP request information is carried in the access request packet that is from the client according to the IP address of the domain comprising the multiple virtual machines and that is received by the previous-hop device of the processor.

6. The network resource balancing method of claim 1, further comprising selecting, by the processor, the virtual machine to meet the load balancing requirement without adding a new protocol.

7. The network resource balancing method of claim 1, wherein the external entity is the client.

8. A network resource balancing device in a cloud computing platform, comprising:
a receiver configured to:
receive identifier information of at least one virtual machine and load information of the at least one virtual machine from a controller in the cloud computing platform;
receive identifier information of a domain from the controller, wherein the domain comprises multiple virtual machines, wherein the at least one virtual machine belongs to the domain, and wherein the identifier information of the at least one virtual machine corresponds to the identifier information of the domain; and
a processor coupled to the receiver and configured to:
determine, according to the identifier information of the domain that is carried in an access request packet of a client, the identifier information of each of the multiple virtual machines in the domain and load information of each of the multiple virtual machines in the domain after the access request packet is received, wherein the identifier information of each of the multiple virtual machines in the domain corresponds to the identifier of the domain that is carried in the access request packet;
select, for the client, a virtual machine to meet a load balancing requirement without interaction between the cloud computing platform and an external entity, wherein the virtual machine is selected from the multiple virtual machines according to the load information of each of the multiple virtual machines; and
send the access request packet to the selected virtual machine according to identifier information of the selected virtual machine, wherein the processor sends the access request packet to the selected virtual machine according to the identifier information of the selected virtual machine by:

changing a destination media access control (MAC) address of the access request packet to a MAC address of the selected virtual machine; and sending the access request packet to the selected virtual machine.

9. The network resource balancing device of claim 8, wherein the identifier information of the at least one virtual machine comprises an Internet Protocol (IP) address and a media access control (MAC) address, wherein the identifier information of the domain comprising the multiple virtual machines comprises an IP address that is the same as the IP address of the at least one virtual machine and a MAC address that is different from the MAC address of the at least one virtual machine, and wherein the multiple virtual machines in the domain comprising the multiple virtual machines comprise a same IP address and different MAC addresses.

10. The network resource balancing device of claim 9, further comprising a transmitter coupled to the processor and configured to send the IP address of the domain comprising the multiple virtual machines to a domain name system (DNS) server such that the client obtains, according to a domain name, the IP address of the domain comprising the multiple virtual machines from the DNS server.

11. The network resource balancing device of claim 10, wherein the receiver is further configured to receive Address Resolution Protocol (ARP) request information from a previous-hop device of the network resource balancing device, wherein the ARP request information comprises the IP address of the domain comprising the multiple virtual machines and is used to request the MAC address corresponding to the IP address of the domain, wherein the transmitter is further configured to send the MAC address of the domain comprising the multiple virtual machines to the previous-hop device of the network resource balancing device, and wherein the receiver is further configured to receive the access request packet that carries the identifier information of the domain comprising the multiple virtual machines and that is from the previous-hop device of the network resource balancing device according to the MAC address of the domain comprising the multiple virtual machines.

12. The network resource balancing device of claim 8, further comprising selecting, by the processor, the virtual machine to meet the load balancing requirement without adding a new protocol.

13. The network resource balancing device of claim 8, wherein the external entity is the client.

* * * * *